United States Patent
Inada et al.

(10) Patent No.: US 10,265,908 B2
(45) Date of Patent: Apr. 23, 2019

(54) METHOD OF MANUFACTURING FAN BLADE AND APPARATUS FOR MANUFACTURING THE SAME FAN BLADE

(71) Applicants: IHI Corporation, Koto-ku (JP); IHI AEROSPACE CO., LTD., Koto-ku (JP)

(72) Inventors: Takaomi Inada, Koto-ku (JP); Hideo Morita, Koto-ku (JP); Hiroyuki Yagi, Koto-ku (JP); Tsutomu Murakami, Koto-ku (JP); Shinichi Tanaka, Koto-ku (JP)

(73) Assignees: IHI Corporation, Koto-ku (JP); IHI AEROSPACE CO., LTD., Koto-ku (JP)

( * ) Notice: Subject to any disclaimer, the term of this patent is extended or adjusted under 35 U.S.C. 154(b) by 682 days.

(21) Appl. No.: 14/815,577

(22) Filed: Jul. 31, 2015

(65) Prior Publication Data

US 2015/0336323 A1  Nov. 26, 2015

Related U.S. Application Data

(63) Continuation of application No. PCT/JP2014/053299, filed on Feb. 13, 2014.

(30) Foreign Application Priority Data

Feb. 13, 2013  (JP) .................. 2013-025804

(51) Int. Cl.
*B29C 51/00* (2006.01)
*F01D 5/28* (2006.01)
(Continued)

(52) U.S. Cl.
CPC .............. *B29C 51/00* (2013.01); *B29C 70/46* (2013.01); *B29C 70/56* (2013.01);
(Continued)

(58) Field of Classification Search
None
See application file for complete search history.

(56) References Cited

U.S. PATENT DOCUMENTS 2,934,317 A * 4/1960 Warnken ................. B29C 43/00
156/229
4,592,701 A * 6/1986 Hahn ..................... B64C 27/33
416/134 A
(Continued)

FOREIGN PATENT DOCUMENTS

JP  57-191496 A  11/1982
JP  61-179720 A   8/1986
(Continued)

OTHER PUBLICATIONS

Dieter, George E.. (1997). ASM Handbook, vol. 20—Materials Selection and Design—56.1 Fiber-Reinforced Composite Materials. ASM International. Retrieved Aug. 24, 2018 from https://app.knovel.com/hotlink/pdf/id:kt007WEAJ2/asm-handbook-volume-20/fiber-reinforced-composite. (Year: 1997).*
(Continued)

*Primary Examiner* — Seyed Masoud Malekzadeh
*Assistant Examiner* — Manley L Cummins, IV
(74) *Attorney, Agent, or Firm* — Oblon, McClelland, Maier & Neustadt, L.L.P.

(57) ABSTRACT

A blank sheet including a plurality of main fibers arranged in parallel with each other, auxiliary fibers and a resin that consolidates the fibers is heated to a temperature at which the resin softens, and then pressed against a fan blade mold with the direction of the main fibers aligned with the longitudinal direction of the fan blade mold. The fan blade mold is shaped so that the length thereof in the longitudinal direction along the surface of a center part thereof in the width direction is shorter than the length thereof in the longitudinal direction along the surface of end parts thereof (Continued)

in the width direction. When the blank sheet is pressed against the fan blade mold, a center part in the width direction of the blank sheet at an end part in the longitudinal direction is pulled with a greater force than end parts in the width direction of the blank sheet at the end part in the longitudinal direction, thereby preventing occurrence of wrinkling.

6 Claims, 11 Drawing Sheets

(51) Int. Cl.
  *B29C 70/46* (2006.01)
  *F04D 29/02* (2006.01)
  *F04D 29/32* (2006.01)
  *B29D 99/00* (2010.01)
  *B29C 70/56* (2006.01)
  *B29L 31/08* (2006.01)

(52) U.S. Cl.
  CPC ......... *B29D 99/0025* (2013.01); *F01D 5/282* (2013.01); *F04D 29/023* (2013.01); *F04D 29/324* (2013.01); *B29L 2031/08* (2013.01); *B29L 2031/082* (2013.01); *F05D 2220/36* (2013.01); *F05D 2230/20* (2013.01); *F05D 2230/40* (2013.01); *F05D 2300/44* (2013.01); *F05D 2300/603* (2013.01)

(56) References Cited

U.S. PATENT DOCUMENTS

| | | |
|---|---|---|
| 5,096,384 A | 3/1992 | Immell et al. |
| 2004/0043196 A1* | 3/2004 | Willden ............... B29C 43/12 428/174 |
| 2007/0092379 A1 | 4/2007 | Coupe et al. |
| 2010/0186882 A1* | 7/2010 | Edelmann ............ B29C 53/04 156/217 |
| 2012/0086144 A1* | 4/2012 | Coffield ............... A47C 7/282 264/138 |
| 2013/0101406 A1* | 4/2013 | Kweder ............... B29C 70/46 415/200 |

FOREIGN PATENT DOCUMENTS

| | | |
|---|---|---|
| JP | 06-500157 A | 1/1994 |
| JP | 06-239340 A | 8/1994 |
| JP | 2007-112132 A | 5/2007 |
| JP | 2011-069286 A | 4/2011 |
| RU | 2 205 130 C1 | 5/2003 |
| RU | 2 413 590 C2 | 3/2011 |

OTHER PUBLICATIONS

International Search Report dated May 20, 2014 for PCT/JP2014/053299 filed Feb. 13, 2014 with English Translation.
English Translation of the Written Opinion dated May 20, 2014 for PCT/JP2014/053299 filed Feb. 13, 2014.
U.S. Appl. No. 14/812,746, filed Jul. 29, 2015, Murakami, et al.

* cited by examiner

METHOD OF MANUFACTURING FAN BLADE AND APPARATUS FOR MANUFACTURING THE SAME FAN BLADE

TECHNICAL FIELD

The present invention relates to a method of manufacturing a fan blade made of a fiber-reinforced composite material, which is a blank sheet comprising a plurality of fibers arranged in parallel with each other consolidated by a resin, and an apparatus for manufacturing the fan blade.

BACKGROUND ART

A turbofan engine used as an engine of an aircraft comprises a fan that produces most of the thrust and a core engine (turbojet engine) provided with a turbine that is disposed behind the fan and drive the fan. The fan and the core engine are coaxially arranged, air sucked by the fan from the front of the engine is divided into air (Gf) that passes through the fan and is discharged to the rear and air (Gc) that is introduced into the core engine, used for combustion to make the turbine rotate and then discharged to the rear. The ratio between the two flows of air (Gf/Gc) is referred to as a bypass ratio.

The higher the bypass ratio, the higher the fuel efficiency is, so that turbofan engines of high bypass ratios have been developed in recent years. As the bypass ratio increases, the ratio of the diameter of the fan to the diameter of the core engine increases, so that the length of the fan blades forming the fan increases. Although conventional fan blades are made of titanium, an aluminum alloy or the like, it has been proposed to use a fiber-reinforced composite material for the fan blades in order to reduce weight and ensure strength in the trend toward larger fan blades (see Patent Documents 1 and 2).

Such a fan blade made of a composite material is molded by thermoforming from a blank sheet that comprises a plurality of fibers arranged in parallel with each other (filaments) consolidated by a resin (a polymer). To mold a product having a three-dimensional shape, such as the fan blade, thermoforming from a blank sheet having a flat shape, the blank sheet is heated to make the resin soften, and then (a) the blank sheet is sandwiched between two molds, (b) the blank sheet is pressed against a mold by compressed air, or (c) the space between a mold and the blank sheet is decompressed to make the blank sheet cling to the mold (see Patent Documents 3 and 4).

PRIOR ART DOCUMENT

Patent Document

Patent Document 1: Japanese Patent Laid-Open No. 2007-112132

Patent Document 2: Japanese Patent Laid-Open No. 2011-69286

Patent Document 3: Japanese Patent Laid-Open No. S61-179720

Patent Document 4: Japanese Patent Laid-Open No. H06-239340

SUMMARY OF THE INVENTION

Problems to be Solved by the Invention

In general, the fan blade has a twisted shape in consideration of the aerodynamic characteristics, and therefore, the surface of the mold that transfers the shape also has a twisted shape. In the case (a) described above, if the mold has such a twisted surface, as the blank sheet is shaped between the two molds to conform to the shape of the molds, wrinkling or entanglement can occur in a peripheral part of the shaped part or other parts. Furthermore, when the two molds are brought closer to sandwich the blank sheet, the blank sheet can move along the uneven shape of the mold and be misaligned with respect to the center of the mold, and the blank sheet can be unable to be properly molded.

In the case (b), if the blank sheet pressed against the mold by the compressed air is substantially deformed, wrinkling is likely to occur as in the case (a), and compressed air of high pressure is needed to properly press the blank sheet against the mold. In the case (c), if the blank sheet clinging to the mold due to decompression is substantially deformed, wrinkling is likely to occur as in the case (a). In addition, although substantial decompression is needed to properly make the blank sheet cling to the mold, there is a limit to the decompression.

In addition, in the cases (b) and (c), since the blank sheet is not sandwiched between two molds but is pressed against one mold by compressed air or made to cling to one mold by decompression, a blank sheet that is hard to deform because of the thickness or material can hardly be molded.

In view of the circumstances described above, an object of the present invention is to provide a method of manufacturing a fan blade by thermoforming from a blank sheet that comprises a plurality of fibers arranged in parallel with each other consolidated by a resin while preventing occurrence of wrinkling, and an apparatus for manufacturing the fan blade.

Means for Solving the Problems

To attain the object described above, an aspect of the invention is directed to a method of manufacturing a fan blade, comprising heating a blank sheet including a plurality of main fibers arranged in parallel with each other, a plurality of auxiliary fibers arranged in parallel with each other so as to intersect with the main fibers, and a resin that consolidates the main fibers and the auxiliary fibers, and pressing the heated blank sheet against a fan blade mold, wherein the fan blade mold is shaped so that a length thereof in a longitudinal direction along a surface of a center part thereof in a width direction is shorter than a length thereof in the longitudinal direction along a surface of end parts thereof in the width direction, and when the blank sheet is pressed against the fan blade mold, the blank sheet is pressed against the fan blade mold with the direction of the main fibers aligned with the longitudinal direction of the fan blade mold, and the center part in the width direction of the blank sheet at an end part in the longitudinal direction of the fan blade mold is pulled with a greater force than the end parts in the width direction of the blank sheet at the end part in the longitudinal direction of the fan blade mold.

In addition, an aspect of the invention is directed to an apparatus for manufacturing a fan blade, the apparatus being configured to heat a blank sheet including a plurality of main fibers arranged in parallel with each other, a plurality of auxiliary fibers arranged in parallel with each other so as to intersect with the main fibers, and a resin that consolidates the main fibers and the auxiliary fibers, and press the heated blank sheet against a fan blade mold, and the apparatus comprising pressing unit that presses the blank sheet against the fan blade mold with the direction of the main fibers aligned with the longitudinal direction of the fan blade mold, wherein the fan blade mold is shaped so that a length thereof in a longitudinal direction along a surface of a center part thereof in a width direction is shorter than a length thereof in the longitudinal direction along a surface of end parts thereof in the width direction, the fan blade mold has a margin part having a shape different from the shape of the fan blade formed along a perimeter thereof, and a cross section angle of the margin part with respect to the direction of pressing the blank sheet is more acute at the center part in the width direction of the end part in the longitudinal direction than at the end parts in the width direction of the end part in the longitudinal direction.

Advantageous Effects of the Invention

With the method of manufacturing a fan blade and the apparatus for manufacturing a fan blade according to the present invention, occurrence of wrinkling can be prevented when the fan blade is formed by thermoforming from a blank sheet comprising a plurality of fibers arranged in parallel with each other consolidated by a resin.

MODE FOR CARRYING OUT THE INVENTION

Figure 1:
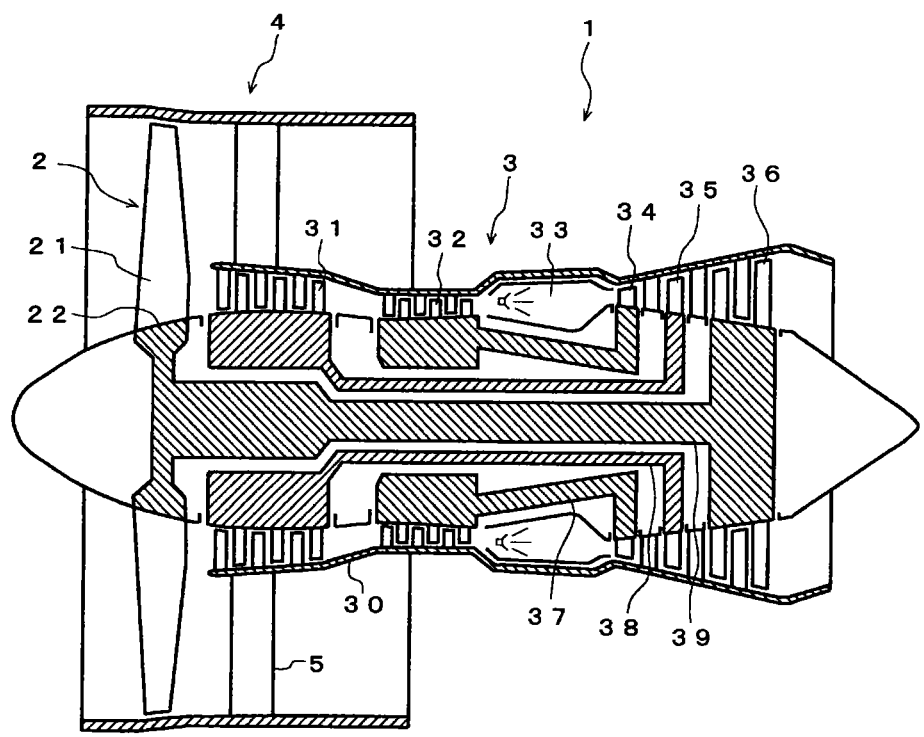
FIG. 1 is a schematic side cross-sectional view of a turbofan engine provided with a fan blade.

In the following, a preferred embodiment of the present invention will be described in detail. The specific dimensions, materials, numerical values and the like shown in the embodiment are given for the illustrative purpose to facilitate understanding of the present invention and are not intended to limit the present invention unless otherwise specified. In the specification and the drawings, elements having substantially the same function or configuration are denoted by the same reference numeral, and redundant description thereof will be omitted. Illustration of elements that are not relevant to the present invention will be omitted.

(Turbofan Engine 1)

FIG. 1 is a schematic side cross-sectional view of a turbofan engine 1 provided with a fan blade. The turbofan engine 1 comprises a fan 2 that produces most of the thrust and a core engine 3 that is disposed behind the fan 2 and is provided with a turbine that drives the fan 2.

The core engine 3 is a turbojet engine that comprises a low pressure compressor 31, a high pressure compressor 32, a combustion chamber 33, a high pressure turbine 34, a low pressure turbine 35 and a fan turbine 36, viewed from upstream to downstream. The high pressure turbine 34 is coupled to the high pressure compressor 32 by a high pressure shaft 37, the low pressure turbine 35 is coupled to the low pressure compressor 31 by a low pressure shaft 38, and the fan turbine 36 is coupled to the fan 2 by a fan shaft 39. Any one of the combination of the high pressure turbine 34 and the high pressure compressor 32 and the combination of the low pressure turbine 35 and the low pressure compressor 31 may be omitted.

(Fan Blade 21)

The fan 2 is provided with a plurality of fan blades 21 arranged at intervals in the circumferential direction, and a fan case 4 having substantially a cylindrical shape is disposed around the fan 2 to surround the fan 2. The fan case 4 is attached to a casing 30 of the core engine 3 by a plurality of struts (support rods) 5 arranged at intervals in the circumferential direction. The fan 2 housed in the fan case 4 comprises a fan disk 22 attached to the fan shaft 39 and the plurality of fan blades 21 provided on the fan disk 22 at intervals in the circumferential direction. The fan blades 21 have a substantially twisted shape in consideration of the aerodynamic characteristics. In the following, a method of manufacturing the fan blade 21 and an apparatus for manufacturing the fan blade 21 will be described.

(Blank Sheet 7)

Figure 2:
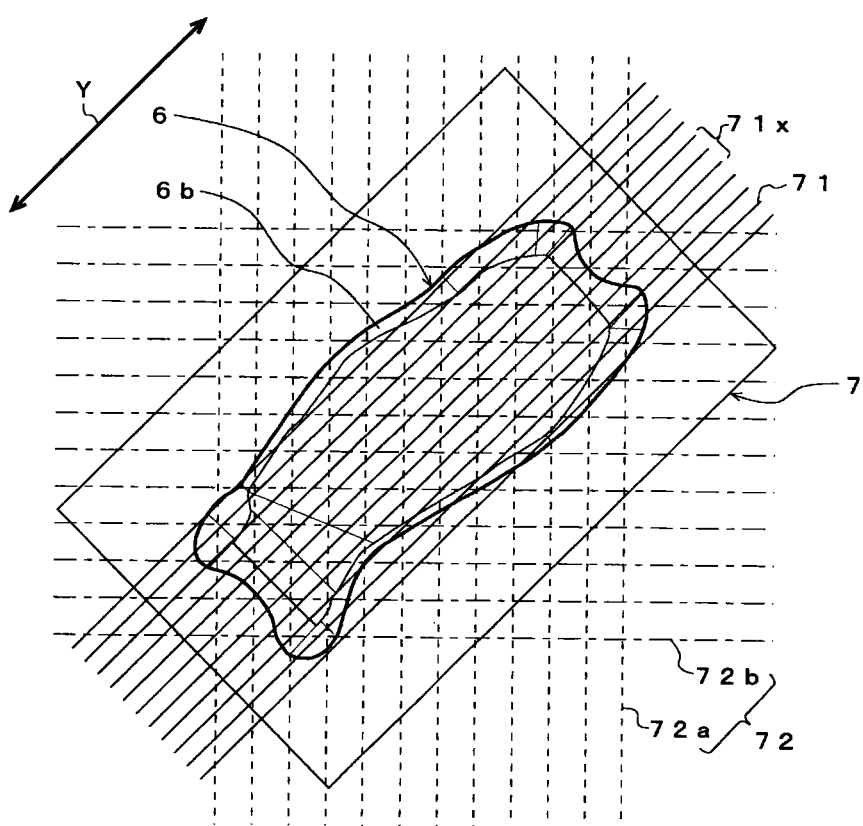
FIG. 2 is an illustrative diagram showing a fan blade mold and a blank sheet comprising main fibers arranged in the longitudinal direction of the fan blade and auxiliary fibers arranged to intersect with the main fibers used in a method of manufacturing a fan blade according to an embodiment of the present invention.

FIG. 2 shows a fan blade mold 6b (referred to also as a drag 6b, hereinafter) and a blank sheet 7 pressed against the fan blade mold 6b. The blank sheet 7 comprises a plurality of main fiber 71 arranged in parallel with each other, a plurality of auxiliary fibers 72 arranged in parallel with each other to intersect with the main fibers 71, and a resin that consolidates the main fibers 71 and the auxiliary fibers 72. A fan blade 21 made of fiber reinforced plastics (FRP), such as carbon fiber reinforced plastics (CFRP), is manufactured by stacking a plurality (8 to 16, for example) of such blank sheets 7 that comprise the resin reinforced by the fibers 71 and 72 and bonding the blank sheets 7 to each other as described below. As required, an interleaf made of a thermoplastic resin may be provided between the blank sheets 7 stacked on one another to improve the adhesion between the layers.

A reinforcing fiber, such as a carbon fiber, an aramid fiber or a glass fiber, is used as the main fibers 71 and the auxiliary fibers 72. The main fibers 71 are oriented in parallel with the longitudinal direction of the fan blade 21 (the longitudinal direction Y of the drag 6b), which is the direction in which the main fibers 71 are pulled by the centrifugal force during rotation of the fan 2, and the auxiliary fibers 72 comprise first auxiliary fibers 72a oriented at an angle of 45 degrees with respect to the main fibers 71 and second auxiliary fibers 72b oriented at an angle of −45 degrees with respect to the main fibers 71. The angles of orientation of the first auxiliary fibers 72a and the second auxiliary fibers 72b are not limited to these angles, and the direction of the main fibers 71 may not be in parallel with the longitudinal direction Y of the drag 6b and may be slightly inclined with respect to the longitudinal direction Y (within a range of ±30 degrees with respect to the longitudinal direction Y, for example).

A thermoplastic resin, such as a polyethylene resin, a polypropylene resin, a polystyrene resin, an ABS resin, a polyvinyl chloride resin, a methyl methacrylate resin, a nylon resin, a fluorocarbon resin, a polycarbonate resin or a polyester resin, is used as the resin that consolidates the main fibers 71 and the auxiliary fibers 72. The thermoplastic resin has a property that the resin softens to exhibit plasticity when the resin is heated and hardens when the resin is cooled.

The blank sheet 7 is molded into a three-dimensional shape by pressing the blank sheet 7 heated to make the resin soften against the drag 6b with the direction of the main fibers 71 aligned with the longitudinal direction of the fan blade mold (drag) 6b with the shape of a lower surface of a molding transferred thereto (thermoforming). A required part is cut out of the molding, and a plurality of such cut parts are stacked and bonded to each other to form the fan blade 21. The blank sheets 7 to be bonded to each other may be molded with molds of different shapes into different three-dimensional shapes.

(Thermoforming Apparatus TF)

Figure 3:
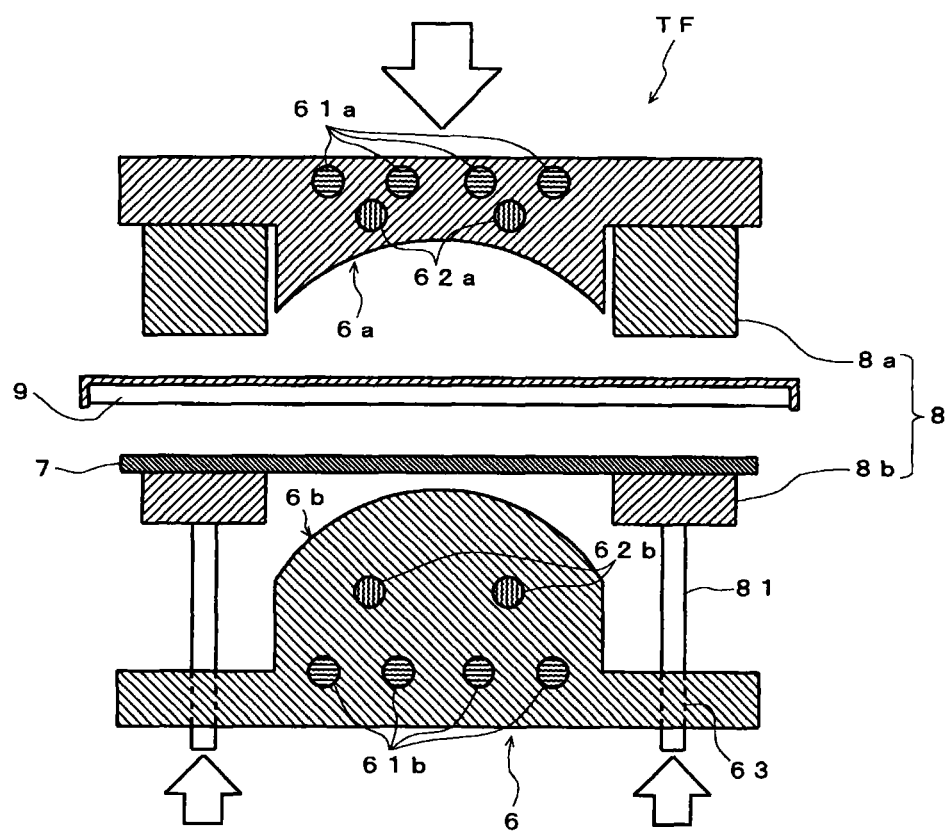
FIG. 3 is a schematic cross-sectional view of a thermoforming apparatus for manufacturing the fan blade.

FIG. 3 is a schematic cross-sectional view of a thermoforming apparatus TF for manufacturing the fan blade 21. The blank sheet 7 is molded into a three-dimensional shape by the thermoforming apparatus TF. The thermoforming apparatus TF comprises the fan blade mold (drag) 6b, a paired fan blade mold 6a (referred to also as a cope 6a, hereinafter) with the shape of an upper surface of a molding transferred, a blank holder device 8 that holds the blank sheet 7, and a heater 9 that heats the blank sheet 7. The cope 6a and the drag 6b form one fan blade mold unit 6.

As shown in FIG. 3, the blank holder device 8 comprises an upper blank holder 8a and a lower blank holder 8b that sandwich the blank sheet 7. The upper blank holder 8a and the lower blank holder 8b have a frame-like shape, and the blank sheet 7 is held between the upper blank holder 8a and the lower blank holder 8b at a part except for a center part thereof, at which the blank sheet 7 faces shape transferring parts (effective molding parts) of the cope 6a and the drag 6b. The blank sheet 7 is placed on the lower blank holder 8b.

The blank sheet 7 placed on the lower blank holder 8b is heated by the heater 9, which is disposed between the upper blank holder 8a and the lower blank holder 8b, to a temperature at which the resin softens (a plastic temperature). The heater 9 is removed from between the upper blank holder 8a and the lower blank holder 8b once the heating is completed, in order that the blank sheet 7 is held by the blank holder device 8 and sandwiched between the cope 6a and the drag 6b. An infrared ray heater (an IR heater) is used as the heater 9, for example.

The drag 6b incorporates a heating pipe 61b that heats the drag 6b and a cooling pipe 62b that cools the drag 6b. A heating fluid flows in the heating pipe 61b to prevent the blank sheet 7 heated to the plastic temperature by the heater 9 from being cooled to a temperature lower than the plastic temperature when the blank sheet 7 comes into contact with the drag 6b. A cooling fluid flows in the cooling pipe 62b in order that, after the blank sheet 7 is molded between the cope 6a and the drag 6b, the drag 6b is cooled to a temperature lower than the plastic temperature to make the molded blank sheet 7 harden. The cope 6a also incorporates a similar heating pipe 61a and a similar cooling pipe 62a. As an alternative to the heating pipes 61a and 61b, a heating device, such as a heating wire or a high-frequency heating device, may be used.

The upper blank holder 8a is attached to the cope 6a and is raised and lowered integrally with the cope 6a by a hydraulic device or the like. The hydraulic device forms pressing unit that presses the blank sheet 7 sandwiched between the upper blank holder 8a and the lower blank holder 8b against the drag 6b. Alternatively, the cope 6a and the upper blank holder 8a may be independently raised and lowered by separate hydraulic devices.

A guide rod 81 provided on a lower part of the lower blank holder 8b is inserted in a guide hole 63 formed in the drag 6b, thereby preventing the lower blank holder 8b from becoming horizontally misaligned with the drag 6b when the lower blank holder 8b is raised and lowered. The guide rod 81 is connected to a hydraulic device that provides a predetermined resistance force to hinder pressing down of the guide rod 81. When the lower blank holder 8b is pressed down by the lowering upper blank holder 8a, the resistance force described above allows the blank sheet 7 to be sandwiched between the upper blank holder 8a and the lower blank holder 8b with a predetermined force.

As described above, the center part of the blank sheet 7 heated to a temperature equal to or higher than the plastic temperature held between the frame-like shaped upper blank holder 8a and lower blank holder 8b is pressed against the drag 6b from above. The drag 6b, the lower blank holder 8b and a margin part 65 of the drag 6b will be described in detail with reference to FIGS. 4 to 7.

(Fan Blade Mold 6b)

Figure 4A:
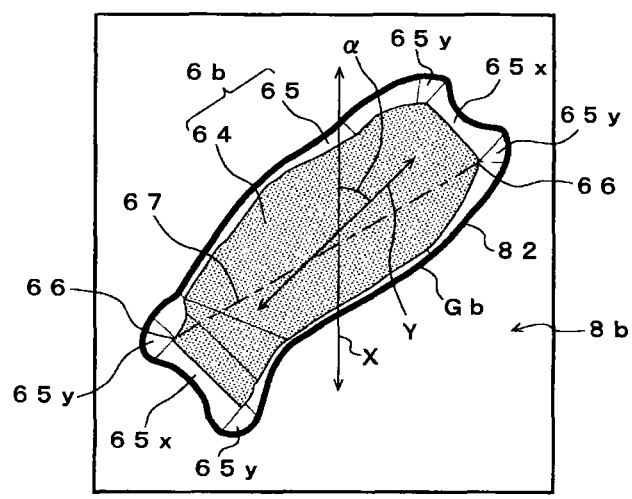
FIG. 4A is a plan view of the fan blade mold and a lower blank holder.
Figure 4B:
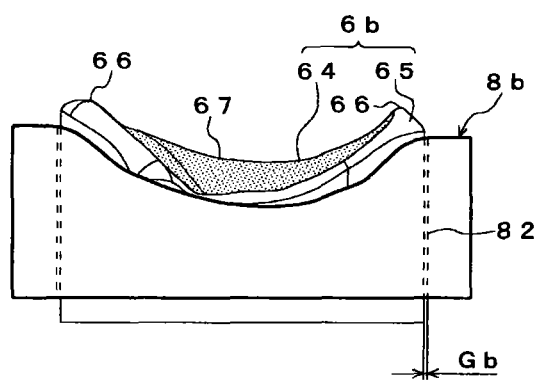
FIG. 4B is a side view of the fan blade mold and the lower blank holder.
Figure 5:
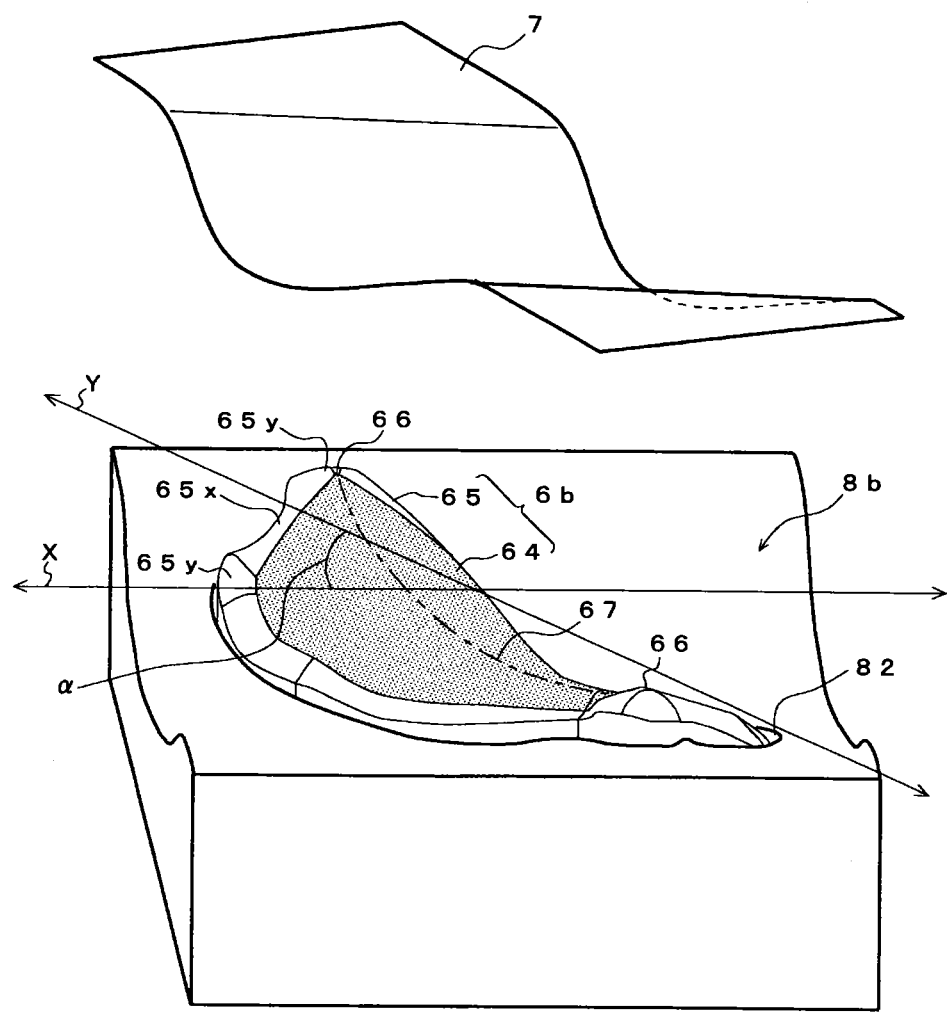
FIG. 5 is a perspective view of the fan blade mold and the lower blank holder shown in FIG. 4 and the blank sheet primarily bent.
Figure 6:
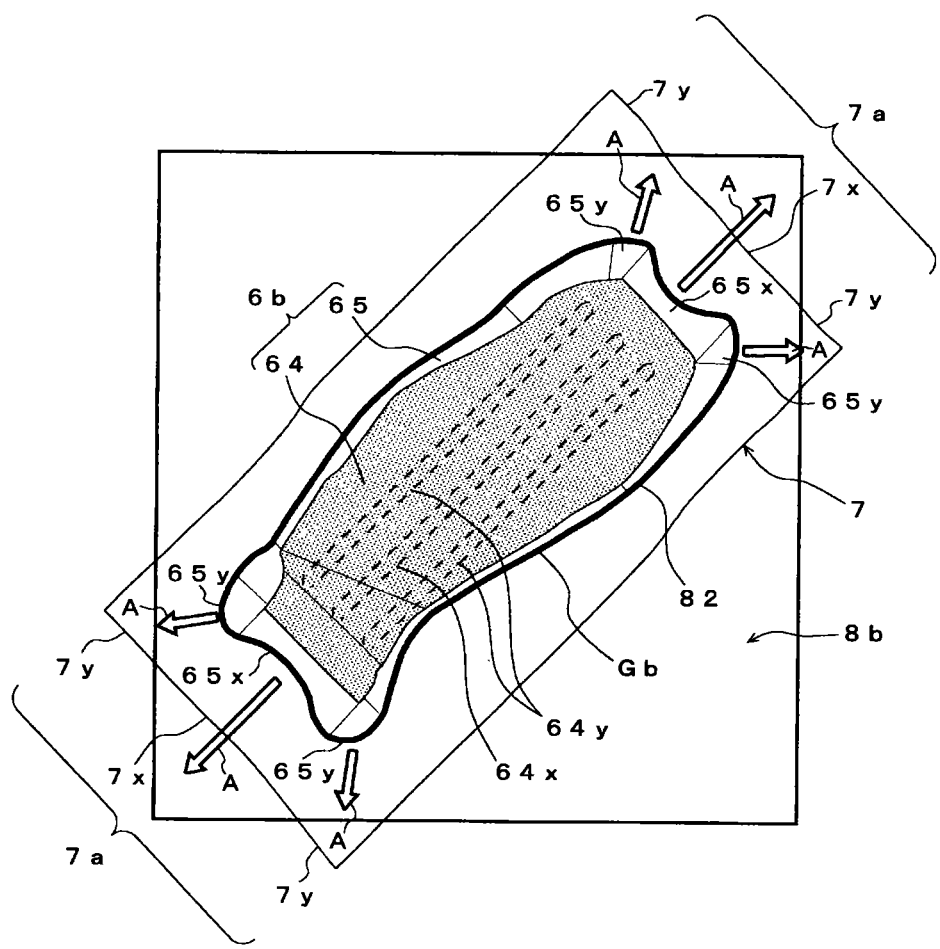
FIG. 6 is an illustrative diagram showing the blank sheet placed on the fan blade mold and the lower blank holder shown in FIGS. 4 and 5, in which the magnitude of the force of pulling the blank sheet is shown by the length of the arrows.
Figure 7A:
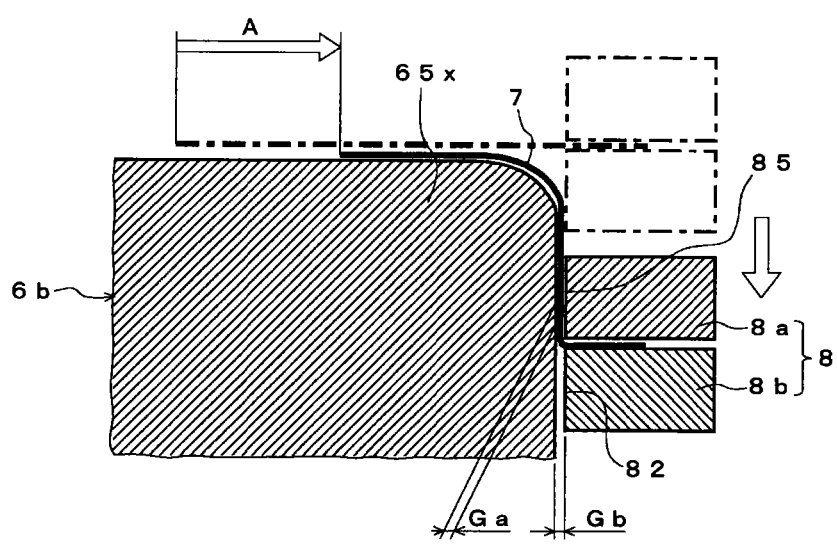
FIG. 7A is a partial cross-sectional view of a center part in the width direction (a part pulled with a greater force) of an end part in the longitudinal direction of the fan blade mold shown in FIG. 6.
Figure 7B:
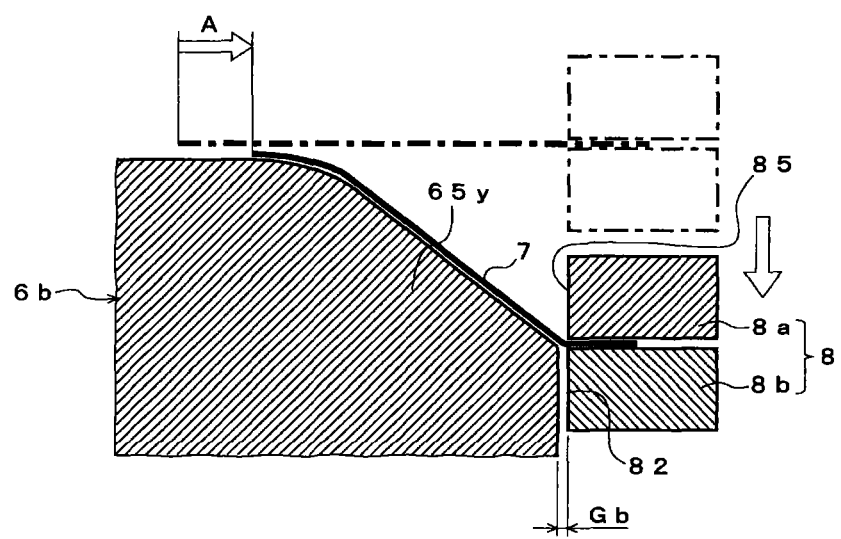
FIG. 7B is a partial cross-sectional view of an end part in the width direction (a part pulled with a smaller force) of the end part in the longitudinal direction of the fan blade mold shown in FIG. 6.

FIG. 4A is a plan view of the fan blade mold (drag) 6b and the lower blank holder 8b, FIG. 4B is a side view of the same, and FIG. 5 is a perspective view showing the drag 6b and the lower blank holder 8b shown in FIGS. 4A and 4B and the blank sheet 7 primarily bent. FIG. 6 is an illustrative diagram showing the blank sheet 7 placed on the drag 6b and the lower blank holder 8b shown in FIGS. 4A, 4B and 5, in which the length of the arrows shows the magnitude of the force of pulling the blank sheet 7. FIGS. 7A and 7B are partial cross-sectional views of the drag 6b and the lower blank holder 8b shown in FIG. 6. FIG. 7A is a partial cross-sectional view of a center part in the width direction of an end part in the longitudinal direction of the drag 6b (a part pulled with a greater force), FIG. 7B is a partial cross-sectional view of an end part in the width direction of the end part in the longitudinal direction of the drag 6b (a part pulled with a smaller force). The drag 6b has a fan blade part 64 (dotted part) with the shape of one of the plurality of stacked blank sheets 7 forming the fan blade 21 transferred thereto, and a margin part 65 that is formed along the perimeter of the fan blade part 64 and does not have the shape of the fan blade 21. Such a drag 6b is slidably inserted into a lower through-hole 82 that is formed in the lower blank holder 8b so as to vertically penetrate the lower blank holder 8b.

As shown in FIG. 4B, the lower through-hole 82 of the lower blank holder 8b is slightly larger than the drag 6b, there is a gap Gb between the inner surface of the lower through-hole 82 and the side surface of the drag 6b, and the gap Gb allows the drag 6b to be slidably inserted into the lower through-hole 82. As shown in FIG. 7A, the upper blank holder 8a also has a lower through-hole 85 into which the drag 6b is to be inserted, there is a gap Ga between the inner surface of the lower through-hole 85 and the side surface of the drag 6b, and the gap Ga allows the upper blank holder 8a to be lowered to a level lower than the top surface of the drag 6b with the blank sheet 7 interposed therebetween. The dimension of the gap Ga is set to be equal to or greater than the thickness of the blank sheet 7.

Since the fan blade 21 is substantially twisted in order to improve the aerodynamic characteristics as described above, the fan blade mold (drag) 6b and the paired fan blade mold (cope) 6a with the shape of the fan blade 21 transferred thereto also have a twisted surface shape. More specifically, as shown in FIGS. 4A, 4B and 5, the drag 6b is shaped (into a substantially col-like shape) to have peak parts (top parts) 66 spaced apart from each other in the longitudinal direction and a ridge part 67 that connects the peak parts 66. In addition, as shown in FIG. 6, the drag 6b is shaped so that the length in the longitudinal direction of a center part 64x in the width direction of the fan blade part 64 along the surface of the drag 6b (which is not the linear length but the length along the surface of the drag 6b) is shorter than the length in the longitudinal direction of end parts 64y in the width direction along the surface of the drag 6b (which is not the linear length but the length along the surface of the drag 6b). The cope 6a is shaped to have projections and recesses that are substantially counterparts of those of the drag 6b.

(Margin Part 65)

As shown in FIGS. 6, 7A and 7B, the margin part 65 of the drag 6b is not uniformly formed along the perimeter of the fan blade part 64 but has different cross-sectional shapes between a center part 65x in the width direction of an end part in the longitudinal direction of the drag 6b and end parts 65y in the width direction of the end part in the longitudinal direction of the drag 6b. The "width direction" is a direction perpendicular to the longitudinal direction Y (see FIG. 4A) of the drag 6b, and the "cross-sectional shape" is the shape of a cross section of the margin part 65 cut in the direction of pressing the blank sheet 7 (vertical direction).

More specifically, the margin part 65 is shaped so that the angle (see FIG. 7A) of the cross-sectional shape of the center part 65x in the width direction of the end part in the longitudinal direction of the drag 6b is more acute than the angle (see FIG. 7B) of the cross-sectional shape of the end parts 65y in the width direction of the end part in the longitudinal direction of the drag 6b. More specifically, the angle of the cross-sectional shape of the center part 65x in the width direction of the margin part 65 (referred to as a cross section angle, hereinafter) is substantially a right angle, while the cross-sectional shape of the end parts 65y in the width direction of the margin part 65 is the shape of a gentle slope. The angle of the cross-sectional shape of the center part 65x in the width direction of the drag 6b (see FIG. 7A) and the angle of the cross-sectional shape of the end parts 65y in the width direction (see FIG. 7B) can be set at any angle, depending on the shape of the blade.

(Method of Manufacturing Fan Blade 21)

First, the lower blank holder 8b shown in FIGS. 4A, 4B and 5 is moved upward until the top surface of the lower blank holder 8b is positioned at a level higher than the drag 6b (see FIG. 3). The blank sheet 7 heated to a temperature equal to or higher than the plastic temperature by the heater 9 or the like is placed on the top surface of the lower blank holder 8b as shown in FIG. 6. Since the fan blade 21 is substantially twisted in order to improve the aerodynamic characteristics as described above, the drag 6b with the shape transferred thereto also has a twisted surface shape. More specifically, as shown in FIG. 5, the drag 6b is shaped (into a substantially col-like shape) to have the peak parts 66 spaced apart from each other in the longitudinal direction and the ridge part 67 that connects the peak parts 66. Therefore, if the blank sheet 7 of a flat shape is pressed against the drag 6b in a thermoforming molding step, the blank sheet 7 first comes into point contact with the peak parts 66 of the drag 6b, and an appropriate tension is not applied to the center part of the blank sheet 7 that is opposed to the ridge part 67 between the peak parts 66, which causes wrinkling.

To avoid this problem, as shown in FIG. 5, the blank sheet 7 is deformed into a curved shape in advance (primary bending) in order that, when the blank sheet 7 is pressed against the drag 6b, the blank sheet 7 first comes into line contact with the ridge part 67 of the fan blade part 64 of the drag 6b. Since the blank sheet 7 first comes into line contact with the ridge part 67 of the fan blade part 64 of the drag 6b, an appropriate tension can be maintained over the entire blank sheet 7 throughout the thermoforming molding step in which the blank sheet 7 is pressed against the drag 6b, and occurrence of wrinkling can be prevented. The shape of the blank sheet 7 bent in advance (primarily bent) is preferably the shape of a developable surface (a surface that can be developed into a flat surface without expansion or shrinkage), because occurrence of wrinkling can be prevented when the blank sheet 7 of a flat shape is primarily bend. The top surface of the lower blank holder 8b shown in FIG. 5 has a curved shape that conforms to the shape of the lower surface of the primarily bent blank sheet 7. In FIG. 4A, an intersection angle α between a generatrix direction X of the primarily bent blank sheet 7 and the longitudinal direction Y of the drag 6b for the blank sheet 7 is equal to or greater than 10 degrees and equal to or smaller than 80 degrees and is preferably equal to or greater than 30 degrees and equal to or smaller than 60 degrees. If the intersection angle α is equal to or greater than 10 degrees and equal to or smaller than 80 degrees, the amount of deformation (deformation from a developable surface to a non-developable surface) in secondary bending in the thermoforming molding can be reduced. If the intersection angle α is equal to or greater than 30 degrees and equal to or smaller than 60 degrees, the amount of deformation can be further reduced, and occurrence of wrinkling can be prevented with higher reliability.

As shown in FIG. 2, the blank sheet 7 is placed on the top surface of the lower blank holder 8b with the direction of the main fibers 71 aligned with the longitudinal direction Y of the drag (fan blade mold) 6b. According to this embodiment, the blank sheet 7 is placed on the top surface of the lower blank holder 8b with the main fibers 71 oriented in parallel with the longitudinal direction Y of the drag 6b to increase the strength and rigidity of the fan blade 21, which is subject to a centrifugal force, as far as possible. However, the main fibers 71 may not be in parallel with the longitudinal direction Y of the drag 6b, if adequate strength and rigidity of the fan blade 21 can be ensured. In that case, the angle between the direction of the main fibers 71 and the longitudinal direction Y of the drag 6b is preferably equal to or smaller than 30 degrees and more preferably equal to or smaller than 10 degrees. This is because, as far as the angle falls within this range, adequate strength and rigidity of the fan blade 21 can be ensured. That is, to align the direction of the main fibers 71 with the longitudinal direction Y of the drag 6b is not exclusively to orient the main fibers 71 in parallel with the longitudinal direction Y of the drag 6b but may be to orient the main fibers 71 so as to form an angle within a range of −30 degrees to +30 degrees (more preferably within a range of −10 degrees to +10 degrees) with the longitudinal direction Y of the drag 6b.

The upper blank holder 8a and the cope 6a shown in FIG. 3 are then integrally lowered by pressing unit, which is constituted by a hydraulic device or the like. The lower surface of the cope 6a is shaped to conform to the shape of the top surface of the drag 6b, and the lower surface of the upper blank holder 8a is shaped to conform to the shape of the top surface of the lower blank holder 8b. The peripheral part of the blank sheet 7 is sandwiched between the upper blank holder 8a and the lower blank holder 8b, the lower blank holder 8b is lowered while being guided by the guide rod 81 as the upper blank holder 8a and the cope 6a are lowered, and the center part of the blank sheet 7 is pressed against the drag 6b, collapsed by the cope 6a and held between the cope 6a and the drag 6b.

In this way, with the direction of the main fibers 71 of the blank sheet 7 aligned with the longitudinal direction Y of the drag 6b, the center part of the blank sheet 7 is pressed against the drag 6b, and the peripheral part of the blank sheet 7 is sandwiched between the upper blank holder 8a and the lower blank holder 8b. As described above, to align the direction of the main fibers 71 of the blank sheet 7 with the longitudinal direction Y of the drag 6b is not exclusively to orient the main fibers 71 in parallel with the longitudinal direction Y of the drag 6b but may be to orient the main fibers 71 so as to form an angle within a range of −30 degrees to +30 degrees (more preferably within a range of −10 degrees to +10 degrees) with the longitudinal direction Y of the drag 6b. Since the blank sheet 7 is held between the frame-like shaped blank holders 8a and 8b, the blank sheet 7 is prevented from being horizontally displaced with respect to the drag 6b and is pressed against the drag 6b with an appropriate tension applied in the direction of the main fibers 71.

Therefore, when the blank sheet 7 is pressed and molded between the cope 6a and the drag 6b, the center part of the blank sheet 7 is appropriately pressed and constantly pulled in the direction of the main fibers 71, so that wrinkling is unlikely to occur. Since the blank sheet 7 is sandwiched between the cope 6a and the drag 6b, a great force can be applied to the blank sheet 7, so that the blank sheet 7 can be precisely deformed to conform to the shapes of the cope 6a and the drag 6b when the blank sheet 7 is hard to deform because of the material, thickness or the like of the blank sheet 7. As required, at least a part of the part of the blank sheet 7 sandwiched between the upper blank holder 8a and the lower blank holder 8b may be configured to slide between the blank holders 8a and 8b when the blank sheet 7 is pressed against the drag 6b, thereby preventing an excessive tension from being applied to the blank sheet 7.

Furthermore, the blank sheet 7 may be pulled at an end part 7a in the longitudinal direction in the direction of the main fibers 71 when the blank sheet 7 is pressed against the drag 6b, thereby preventing occurrence of wrinkling of the blank sheet 7. The drag 6b with the shape of the fan blade 21 transferred thereto has a twisted shape as described above. More specifically, the drag 6b is shaped so that the length in the longitudinal direction of the center part 64x in the width direction of the fan blade part 64 along the surface of the drag 6b (which is not the linear length but the length along the surface of the drag 6b) is shorter than the length in the longitudinal direction of the end parts 64y in the width direction along the surface of the drag 6b (which is not the linear length but the length along the surface of the drag 6b). Therefore, if the blank sheet 7 is pressed against the drag 6b and all the main fibers 71 shown in FIG. 2 are pulled with a uniform force in the thermoforming molding step, main fibers 71x (see FIG. 2) in the center part 64x in the width direction have an excess length, and wrinkling tends to occur in the main fibers 71x in the center part 64x in the width direction.

To avoid this problem, as shown by the arrows A in FIG. 6, when the blank sheet 7 is pressed against the drag 6b having the shape described above, a center part 7x in the width direction of the blank sheet 7 that comes into contact with the center part 65x in the width direction of the margin part 65 of the end part in the longitudinal direction of the drag 6b is pulled with a greater force than end parts 7y in the width direction of the blank sheet 7 that come into contact with the end parts 65y in the width direction of the margin part 65 of the end part in the longitudinal direction of the drag 6b, thereby preventing the main fibers 71x in the center part 64x in the width direction from having an excess length and thereby preventing wrinkling from occurring in the main fibers 71x.

That is, as shown in FIGS. 6, 7A and 7B, the cross section angle of the center part 65x in the width direction of the margin part 65 of the end part in the longitudinal direction of the drag 6b is more acute than the cross section angle of the end parts 65y in the width direction of the margin part 65 of the end part in the longitudinal direction of the drag 6b. Therefore, when the blank sheet 7 held by the blank holder device 8 is lowered and pressed against the drag 6b, as shown by the arrows A in FIGS. 6 and 7A, the center part 7x in the width direction of the end part 7a in the longitudinal direction of the blank sheet 7 is pulled along the main fibers 71 with a greater force than the end parts 7y in the width direction of the end part 7a in the longitudinal direction of the blank sheet 7. The length of the arrows A shown in FIGS. 6, 7A and 7B shows the magnitude of the force of pulling the blank sheet 7.

Since the center part 7x in the width direction of the end part 7a in the longitudinal direction of the blank sheet 7 is pulled along the main fibers 71 with a greater force than the end parts 7y in the width direction of the end part 7a in the longitudinal direction of the blank sheet 7 as described above, the main fibers 71x (see FIG. 2) in the center part of the blank sheet 7 can be prevented from having an excess length, and wrinkling can be prevented from occurring in the center part of the molding. The force of pulling each main fiber 71 can be adjusted by changing the cross section angle of the center part 65x and the end parts 65y in the width direction of the margin part 65 along the width direction.

(Modifications)

Figure 8:
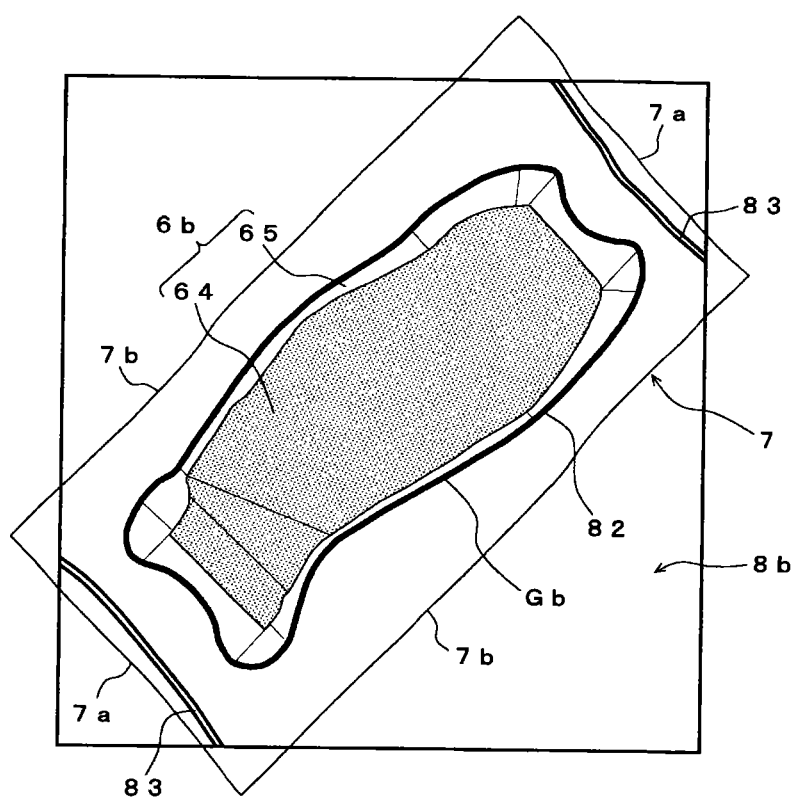
FIG. 8 is a plan view of a fan blade mold and a lower blank holder forming an apparatus for manufacturing a fan blade according to a modification of the present invention and a blank sheet placed on the fan blade mold and the lower blank holder.
Figure 9:
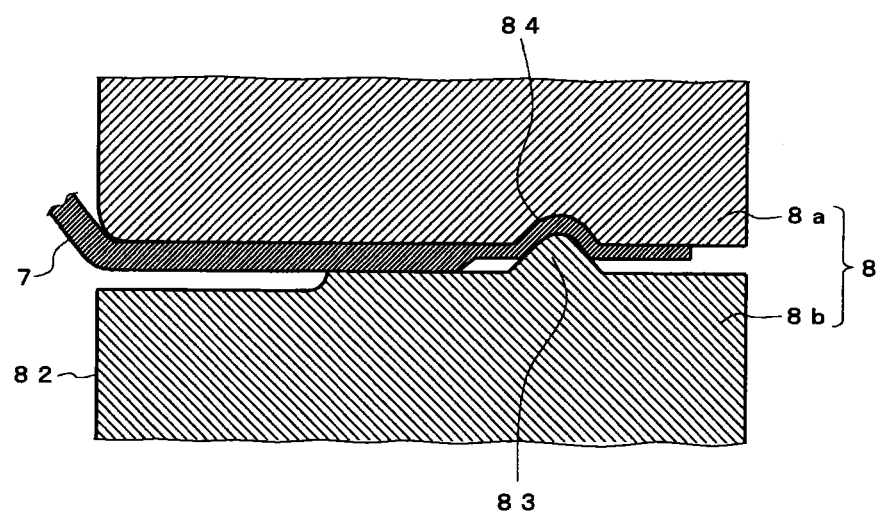
FIG. 9 is a side cross-sectional view of essential parts of the lower blank holder shown in FIG. 8.

A modification according to the present invention is shown in FIGS. 8 and 9. FIG. 8 is a plan view of the primarily bent blank sheet 7 placed on the drag 6b and the lower blank holder 8b according to the modification, and FIG. 9 is a side cross-sectional view of essential parts of the components shown in FIG. 8. As shown in FIG. 8, a projection 83 having a bead-like shape and extending in a direction intersecting with the longitudinal direction of the drag 6b is formed on the top surface of the lower blank holder 8b (the surface facing the upper blank holder 8a) at a position outside the end part in the longitudinal direction of the drag 6b. A recess 84 (see FIG. 9) shaped to conform to the shape of the projection 83 is formed in the lower surface of the upper blank holder 8a. The projection 83 and the recess 84 are formed to extend in a direction substantially perpendicular to the longitudinal direction of the drag 6b. As required, the upper blank holder 8a may have the projection 83, and the lower blank holder 8b may have the recess 84.

With this configuration, when the heated blank sheet 7 in the plastic state is sandwiched between the upper blank holder 8a and the lower blank holder 8b, the part of the blank sheet 7 pushed by the projection 83 gets into the recess 84, so that the blank sheet 7 is pulled in the direction of the main fibers 71, and the part of the blank sheet 7 held by the projection 83 and the recess 84 is prevented from sliding in the direction of the main fibers 71. Therefore, when the blank sheet 7 in the plastic state sandwiched between the upper blank holder 8a and the lower blank holder 8b is pressed against the drag 6b, a higher tension can be applied to the end parts 7a of the blank sheet 7 in the longitudinal direction of the drag 6b than end parts 7b of the blank sheet 7 in the direction perpendicular to the longitudinal direction of the drag 6b, so that occurrence of wrinkling in the molding can be prevented. A frictional part, such as one comprising a plurality of fine projections and recesses, may be formed on the projection 83 and the recess 84 to prevent sliding of the part of the blank sheet 7 sandwiched between the projection 83 and the recess 84 with higher reliability.

Alternatively, the projection 83 described above may be formed on the upper surface of the lower blank holder 8b at a desired position along the circumference of the drag 6b, and the recess 84 may be formed in the lower surface of the upper blank holder 8a at a corresponding position, thereby preventing sliding of the part of the blank sheet at which the projection 83 and the recess 84 are formed and increasing the tension at the desired position. A part of the blank sheet 7 at which the projection 83 and the recess 84 are not formed may be allowed to slide between the blank holders 8a and 8b to a greater extent than the part of the blank sheet 7 at which the projection 83 and the recess 84 are formed.

Although a preferred embodiment of the present invention has been described with reference to the accompanying drawings, of course, the present invention is not limited to the embodiment described above, and various alterations and modifications described in the claims are included in the technical scope of the present invention. For example, in FIG. 3, after the blank sheet 7 is held by the blank holder device 8 (the upper blank holder 8a and the lower blank holder 8b), a heating device other than the heater 9 may be used to heat the blank sheet 7 to a temperature at which the resin softens. In that case, the upper blank holder 8a is preferably separate from the cope 6a.

Summary of Embodiment

According to a first aspect of the present invention, there is provided a method of manufacturing a fan blade, comprising heating a blank sheet including a plurality of main fibers arranged in parallel with each other, a plurality of auxiliary fibers arranged in parallel with each other so as to intersect with the main fibers, and a resin that consolidates the main fibers and the auxiliary fibers, and pressing the heated blank sheet against a fan blade mold, wherein the fan blade mold is shaped so that a length thereof in a longitudinal direction along a surface of a center part thereof in a width direction is shorter than a length thereof in the longitudinal direction along a surface of end parts thereof in the width direction, and when the blank sheet is pressed against the fan blade mold, the blank sheet is pressed against the fan blade mold with the direction of the main fibers aligned with the longitudinal direction of the fan blade mold, and the center part in the width direction of the blank sheet at an end part in the longitudinal direction of the fan blade mold is pulled with a greater force than the end parts in the width direction of the blank sheet at the end part in the longitudinal direction of the fan blade mold.

According to a second aspect of the present invention, in the first aspect described above, the fan blade mold is shaped to have peak parts spaced apart from each other and a ridge part that connects the peak parts, the blank sheet is bent in advance so as to come into contact with the ridge part of the fan blade mold before the heated blank sheet is pressed against the fan blade mold, and the bent blank sheet is pressed against the fan blade mold in such a manner that the blank sheet first comes into line contact with the ridge part.

According to a third aspect of the present invention, in the second aspect described above, the shape of the blank sheet bent in advance is the shape of a developable surface.

According to a fourth aspect of the present invention, in any one of the first to third aspects described above, the blank sheet is held by a frame-like shaped blank holder device, and the blank sheet held by the blank holder device is pressed against the fan blade mold.

According to a fifth aspect of the present invention, in the fourth aspect described above, when the blank sheet held by the blank holder device is pressed against the fan blade mold, at least a part of the blank sheet held by the blank holder device slides from the blank holder device.

According to a sixth aspect of the present invention, in the fourth or fifth aspect described above, the blank sheet held by the blank holder device is pressed against the fan blade mold, and a paired fan blade mold, which is a counterpart of the fan blade mold, is pressed against the surface of the blank sheet opposite to the surface pressed against the fan blade mold so that the blank sheet is sandwiched between the two molds.

According to a seventh aspect of the present invention, there is provided an apparatus for manufacturing a fan blade, the apparatus being configured to heat a blank sheet including a plurality of main fibers arranged in parallel with each other, a plurality of auxiliary fibers arranged in parallel with each other so as to intersect with the main fibers, and a resin that consolidates the main fibers and the auxiliary fibers, and press the heated blank sheet against a fan blade mold, and the apparatus comprising pressing unit that presses the blank sheet against the fan blade mold with the direction of the main fibers aligned with the longitudinal direction of the fan blade mold, wherein the fan blade mold is shaped so that a length thereof in a longitudinal direction along a surface of a center part thereof in a width direction is shorter than a length thereof in the longitudinal direction along a surface of end parts thereof in the width direction, the fan blade mold has a margin part having a shape different from the shape of the fan blade formed along a perimeter thereof, and a cross section angle of the margin part with respect to the direction of pressing the blank sheet is more acute at the center part in the width direction of the end part in the longitudinal direction than at the end parts in the width direction of the end part in the longitudinal direction.

According to an eighth aspect of the present invention, the apparatus further comprises a frame-like shaped blank holder device that holds the blank sheet in a heated state, wherein the blank sheet held by the blank holder device is pressed against the fan blade mold by the pressing unit.

According to a ninth aspect of the present invention, in the eighth aspect described above, the blank holder device comprises an upper blank holder and a lower blank holder between which the blank sheet is sandwiched, and an uneven part for preventing the blank sheet from sliding from between the upper blank holder and the lower blank holder is formed at least a part of opposed surfaces of the upper blank holder and the lower blank holder.

According to a tenth aspect of the present invention, in any one of the seventh to ninth aspects described above, the apparatus further comprises a paired fan blade mold that is a counterpart of the fan blade mold, wherein the paired fan blade mold is moved so as to be pressed against the surface of the blank sheet that is opposed to the surface pressed against the fan blade mold to push the blank sheet toward the fan blade mold.

INDUSTRIAL APPLICABILITY

The present invention can be applied to a method of manufacturing a fan blade made of a fiber-reinforced composite material, which is a blank sheet comprising a plurality of fibers arranged in parallel with each other consolidated by a resin, and an apparatus for manufacturing the fan blade.

EXPLANATION OF REFERENCE SIGNS 2 fan
21 fan blade
6 fan blade mold unit
6a paired fan blade mold (cope)
6b fan blade mold (drag)
64 fan blade part
64x center part in width direction
64y end part in width direction
65 margin part
66 peak part
67 ridge part
7 blank sheet
71 main fiber
72 auxiliary fiber
7a end part in longitudinal direction
7b end part in direction perpendicular to longitudinal direction
7x center part in width direction
7y end part in width direction
8 blank holder device
8a upper blank holder
8b lower blank holder
83 projection
84 recess

The invention claimed is:

1. A method of manufacturing a fan blade comprising:
heating a blank sheet including a plurality of main fibers arranged in parallel with each other and a plurality of auxiliary fibers arranged so as to intersect with the plurality of main fibers, and a resin that consolidates the plurality of main fibers and the plurality of auxiliary fibers, the plurality of auxiliary fibers comprising first auxiliary fibers arranged in parallel with each other oriented at an angle of 45 degrees with respect to the plurality of main fibers and second auxiliary fibers arranged in parallel with each other oriented at an angle of −45 degrees with respect to the plurality of main fibers;
pressing the heated blank sheet against a fan blade mold;
wherein a length of the fan blade mold in a longitudinal direction along a center part in a width direction of a surface of the fan blade mold is shorter than a length of the fan blade mold in the longitudinal direction along end parts in the width direction of the surface of the fan blade mold; and
when the heated blank sheet is pressed against the fan blade mold,
a peripheral part of the heated blank sheet is sandwiched by a blank holder device and is pressed against the fan blade mold with a direction of the plurality of main fibers aligned with the longitudinal direction of the fan blade mold, and
a center part in a width direction of the heated blank sheet is pulled in a direction of the plurality of main fibers with a greater force than end parts in the width direction of the heated blank sheet.

2. The method of manufacturing a fan blade according to claim 1, wherein the fan blade mold is shaped to have peak parts spaced apart from each other and a ridge part that connects the peak parts,
the blank sheet is bent in advance along the ridge part before the blank sheet is heated and then pressed against the fan blade mold, and
the heated blank sheet is pressed against the fan blade mold in such a manner that the heated blank sheet first comes into line contact with the ridge part.

3. The method of manufacturing a fan blade according to claim 2, wherein the blank sheet is bent in advance to be a developable surface.

4. The method of manufacturing a fan blade according to claim 1, wherein, when the blank sheet sandwiched by the blank holder device is pressed against the fan blade mold, at least a part of the blank sheet sandwiched by the blank holder device slides from the blank holder device.

5. The method of manufacturing a fan blade according to claim 1, wherein while the blank sheet is sandwiched by the blank holder device, a first surface of the heated blank sheet is pressed against the fan blade mold, and a paired fan blade mold, which is a counterpart of the fan blade mold, is pressed against a second surface of the heated blank sheet opposite to the first surface pressed against the fan blade mold so that the heated blank sheet is sandwiched between the fan blade mold and the paired fan blade mold.

6. The method of manufacturing a fan blade according to claim 4, wherein while the heated blank sheet is sandwiched by the blank holder device, a first surface of the heated blank sheet is pressed against the fan blade mold, and a paired fan blade mold, which is a counterpart of the fan blade mold, is pressed against a second surface of the heated blank sheet opposite to the first surface pressed against the fan blade mold so that the heated blank sheet is sandwiched between the fan blade mold and the paired fan blade mold.

* * * * *